S. W. GERRISH.
FRUIT PICKER.
APPLICATION FILED MAR. 22, 1918.
1,295,888. Patented Mar. 4, 1919.
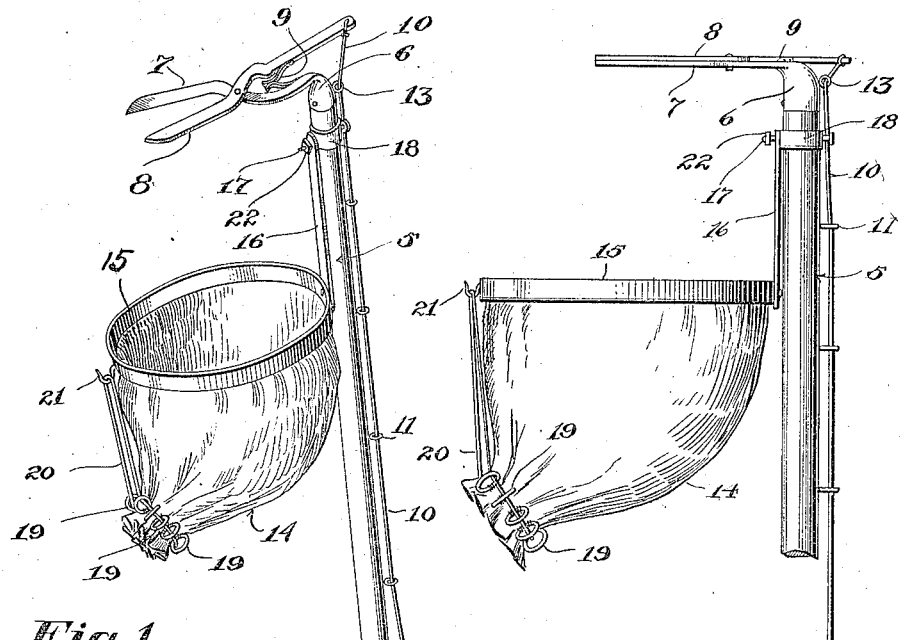
Fig. 2.
Fig. 1.
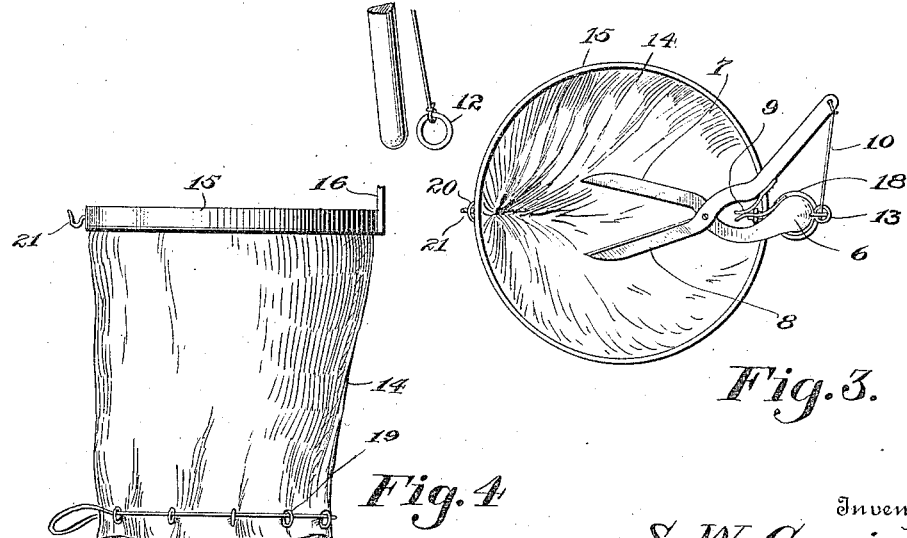
Fig. 3.
Fig. 4.
Witnesses
Inventor
S. W. Gerrish
By Chandler & Chandler
Attorneys

UNITED STATES PATENT OFFICE.

SELDON W. GERRISH, OF GREENVILLE JUNCTION, MAINE.

FRUIT-PICKER.

1,295,888. Specification of Letters Patent. Patented Mar. 4, 1919.

Application filed March 22, 1918. Serial No. 223,956.

*To all whom it may concern:*

Be it known that I, SELDON W. GERRISH, a citizen of the United States, residing at Greenville Junction, in the county of Piscataquis, State of Maine, have invented certain new and useful Improvements in Fruit-Pickers; and I do hereby declare the following to be a full, clear, and exact description of the invention, such as will enable others skilled in the art to which it appertains to make and use the same.

The present invention relates to new and useful improvements in fruit pickers, more particularly of that type adapted for picking fruit from trees by a person standing on the ground, and comprising a pole having a cutting mechanism at its upper end and having also a sack at its upper end to receive the cut fruit in a manner preventing bruising or abrasion thereof.

It is in general the object of the present invention to simplify the structure and to improve the efficiency of devices of this general character, and it is more particularly an object to provide a picking device wherein the receiving sack is at all times maintained in proper suspension under the cutting mechanism in inclined cutting positions of the pole to insure its reception of the cut fruit.

A further object resides in the provision of an arrangement whereby the fruit receiving sack may be inserted in a barrel or other receptacle and then emptied, to deposit the fruit in a manner imparting the least bruising damage thereto.

With the above and other objects and advantages in view, the invention resides more particularly in the novel combination, formation and arrangement of parts hereinafter described and particularly pointed out in the appended claim.

In the accompanying drawings:

Figure 1 is a perspective view of the improved fruit picker, showing the pole thereof inclined.

Fig. 2 is a side elevational view of the upper portion of the picker.

Fig. 3 is a plan view thereof.

Fig. 4 is a detail view showing the bottom of the receiving sack open.

Referring now more particularly to the drawings, 5 designates the pole of the improved picking device, which has its upper end secured in a laterally turned socket 6 at one end of the shank of a stationary shear member 7 on which is pivoted the intermediate portion of a shear member 8 movable in a plane substantially perpendicular to the axis of the pole and resiliently urged to space the shear blades in open position by leaf springs 9 disposed between the shank portions of the shear members. The shear member 8 is operated from the handle end of the pole by a cable 10 passed through a series of guide rings 11 on the pole and having one end secured to the shank of the shear member 8 and its other end secured to a finger ring 12, said cable also passing through a ring 13 on the pole receiving socket 6 whereby the pulling force of the cable is exerted in a line at right angles to its general extent.

For receiving the fruit cut by the shears, a sack 14 is provided having a preferably metallic mouth ring 15 at one side of which is rigidly secured a suspension bar 16 extending at right angles from the plane of the ring and apertured at its free end to loosely engage on a pin 17 carried by a collar 18 on the upper end portion of the pole and extending from said collar in the direction of the shear members the aperture of the bar being of greater diameter than the pin whereby to permit pivotal movement of the bar in a plane including the axis of the pin. The lower end of this sack is open and is provided with a series of rings 19 through which is passed a draw string loop 20 adapted to engage, in the closed position of the sack as shown in Fig. 1, on a hook 21 carried by the mouth ring 15.

By the foregoing construction, the normally closed sack is freely suspended for practically universal swinging movement to properly underlie the shears in the various inclined positions of the pole which would be assumed in cutting the fruit, the suspension bar 16 being retained on the pin 17 by a nut 22 threaded on the free end of the pin.

This free suspension of the sack also permits the sack to be dumped into a barrel or other receptacle without bruising the fruit, since the handle may be swung to one side of the sack and the sack then deposited in a barrel and opened at its bottom by detaching the draw loop from the hook 21 at the mouth end of the sack, the sack being then withdrawn from about the fruit.

An exceedingly simple and readily manipulated device has thus been provided which will cut and deposit fruit in a manner imparting no more damage thereto than the operation of picking said fruit by hand, it being noted that the depth of the sack is not sufficient to permit bruising of the fruit in dropping thereinto.

What is claimed is:

A fruit picker comprising a pole, shears extending laterally from the upper end of the pole, a bar freely suspended from the pole in a manner permitting pivotal movement of the bar relative to the pole, a receiving sack including a stiff mouth ring rigidly secured to and extending laterally from the bar in the direction of the shears, the bottom portion of the sack being open and means for closing the bottom portion of the sack operable from the mouth portion thereof.

In testimony whereof, I affix my signature, in the presence of two witnesses.

SELDON W. GERRISH.

Witnesses:
CHAS. H. MARSHALL,
WALTER E. CRAIG.

Copies of this patent may be obtained for five cents each, by addressing the "Commissioner of Patents, Washington, D. C."